C. A. WOOLSEY.
ANIMAL TRAP.
APPLICATION FILED OCT. 12, 1917.
1,311,736.
Patented July 29, 1919.
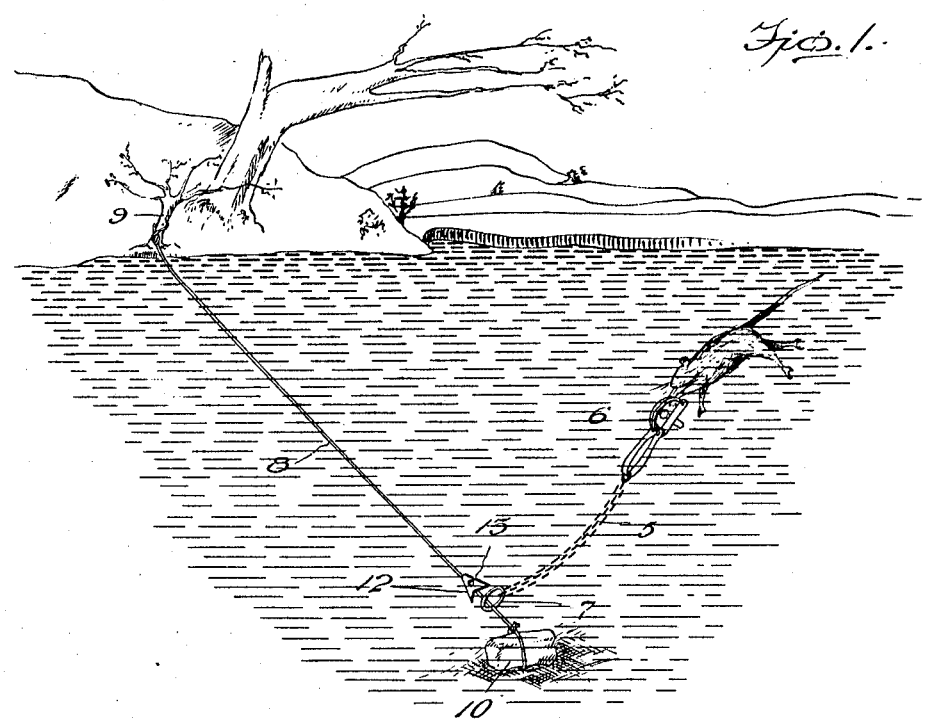
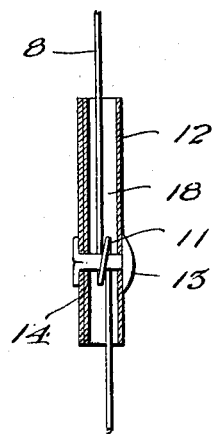
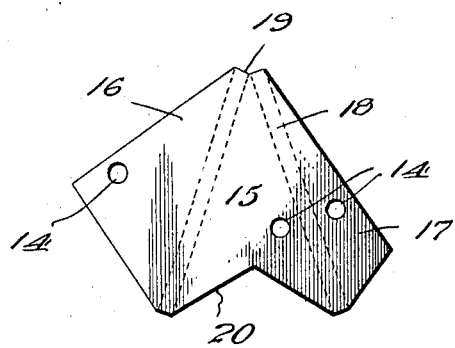
Inventor
Charles A. Woolsey
By Victor J. Evans
Attorney
Witness

UNITED STATES PATENT OFFICE.

CHARLES A. WOOLSEY, OF GREENEVILLE, TENNESSEE.

ANIMAL-TRAP.

1,311,736.   Specification of Letters Patent.   Patented July 29, 1919.

Application filed October 12, 1917. Serial No. 196,215.

*To all whom it may concern:*

Be it known that I, CHARLES A. WOOLSEY, a citizen of the United States, residing at Greeneville, in the county of Greene and State of Tennessee, have invented new and useful Improvements in Animal-Traps, of which the following is a specification.

The invention relates generally to animal traps, and particularly to an attachment primarily designed for catching animals which inhabit the banks of rivers and streams and capable of drowning the animal after it is caught in the trap.

In carrying out the invention, I contemplate, among other features, the provision of a device of the above stated character which is simple in construction, strong, durable, efficient and reliable in use, may be manufactured and sold at comparatively low cost, and one capable of concealing the animal from view.

A further object of the invention is the provision of a novel construction of anchor line which facilitates the connection of the keeper or stop to said line in a simple and quick manner.

With the above and other objects in view, the invention consists in the novel features, details of construction and combination of parts which will hereinafter be more fully set forth, illustrated in the accompanying drawing and pointed out in the appended claims.

Figure 1 is a perspective view of the device shown applied for use;

Fig. 2 is an enlarged transverse section taken through the keeper and anchor line clearly illustrating the manner of connection of the keeper with said line; and Fig. 3 is a plan view of the blank from which the keeper is constructed.

Referring more particularly to the accompanying drawing, 5 denotes a chain attached at one end to a trap 6 capable of catching animals usually inhabiting streams or rivers, such as musk rats, minks, beavers or the like, and to the opposite end of this chain is a ring 7 which is slidably mounted around the line 8.

I contemplate providing lines of various appreciable lengths capable of connecting at one end with a stump or the like denoted by the character 9, and to the outer end of the line is carried a weight 10. Consequently, by throwing the weight into the stream or river, this will stretch the line to cause the ring 7 of the trap to slide upon the line by the action of the animal, due to the fact that the first impulse of the animal after being entrapped is to plunge into deep water as a refuge.

The line 8 is preferably constructed from a single strand of wire or the like material and looped at a point adjacent its point of connection with the weight, to provide therein a laterally extending eye 11, serving to connect on the line a metallic keeper or stop 12, by the passing of a rivet 13 through the openings 14 of the keeper and through the eye 11 of the line.

The keeper in this particular instance comprises a blank of sheet metal including a body portion 15 having a pair of wings 16 and 17 formed on the opposite rearwardly converging longitudinal edges thereof adapted upon the bending of the blank to overlap one another and register the opening 14 of the keeper in alinement with the eye 11. In the overlapping operation of the wings, care is exercised in spacing the confronting face thereof from the confronting face of the body 15. The spacing of the wings accommodates the insertion therebetween of the laterally extending eye 11. The point of location of the aperture or opening 14 with respect to the wall 18, facilitates the engagement of the eye 11 with said wall, preventing further enlargement of the eye when the line is subjected to strain, and these features through the coöperation of the rivet 13 serve to lock the keeper against movement on said line.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is:—

1. In an attachment for traps, the combination with a line bent at a point to provide a laterally extending eye, an apertured keeper mounted on said line, and a rivet passing through the apertures of the keeper and through said eye for fixedly connecting the keeper to said line.

2. In an attachment for traps, comprising a line having a laterally extending eye, a keeper slidably mounted on said line, said keeper being provided with overlapping converging wings, the eye of the line engaging with the keeper and means for limiting the movement of the keeper beyond said eye.

3. In an attachment for traps, comprising a line having a laterally extending eye, a keeper slidably mounted on said line, said keeper being provided with overlapping converging wings, the eye of the line engaging with one of the converging edges of the keeper for limiting the movement of the keeper beyond said eye, and means passing through said keeper and through the eye of the line for fixedly connecting the former with the latter.

4. In an attachment for traps, the combination with a line and a trap, of a ring having connection with the trap and slidably mounted on said line, a keeper mounted on said line and provided with opposed converging walls, a portion of the line engaging with one wall of the keeper, and means passing through that portion of the line and through said keeper for limiting the movement of the latter upon the line.

In testimony whereof I affix my signature.

CHARLES A. WOOLSEY.

Copies of this patent may be obtained for five cents each, by addressing the "Commissioner of Patents, Washington, D. C."